US012459258B2

(12) United States Patent
Goto et al.

(10) Patent No.: US 12,459,258 B2
(45) Date of Patent: Nov. 4, 2025

(54) LIQUID DISPENSING HEAD

(71) Applicant: RISO Technologies Corporation, Tokyo (JP)

(72) Inventors: Taiki Goto, Izunokuni Shizuoka (JP); Masashi Shimosato, Mishima Shizuoka (JP); Noboru Nitta, Tagata Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 136 days.

(21) Appl. No.: 18/332,504

(22) Filed: Jun. 9, 2023

(65) Prior Publication Data

US 2024/0066866 A1 Feb. 29, 2024

(30) Foreign Application Priority Data

Aug. 26, 2022 (JP) ................................ 2022-134889

(51) Int. Cl.
*B41J 2/14* (2006.01)

(52) U.S. Cl.
CPC .. *B41J 2/14233* (2013.01); *B41J 2002/14306* (2013.01)

(58) Field of Classification Search
CPC .......... B41J 2/14233; B41J 2002/14306; B41J 2002/14419; B41J 2202/11; B41J 2202/12; B41J 2/14201
See application file for complete search history.

(56) References Cited

U.S. PATENT DOCUMENTS

| | | | | |
|---|---|---|---|---|
| 8,851,639 | B2 | 10/2014 | Arimoto | |
| 10,160,226 | B2 | 12/2018 | Kohda | |
| 2013/0208059 | A1* | 8/2013 | Arimoto | B41J 2/14233 347/85 |
| 2014/0078224 | A1 | 3/2014 | Park | |
| 2021/0114375 | A1* | 4/2021 | Tamai | B41J 2/18 |
| 2021/0162758 | A1 | 6/2021 | Fukuzawa | |

FOREIGN PATENT DOCUMENTS

| | | | |
|---|---|---|---|
| EP | 2628599 | B1 | 7/2018 |
| JP | 2001063047 | A | 3/2001 |

OTHER PUBLICATIONS

Extended European Search Report dated Jan. 19, 2024, mailed in counterpart European Application No. 23184045.5, 9 pages.

* cited by examiner

*Primary Examiner* — Lisa Solomon
(74) *Attorney, Agent, or Firm* — Kim & Stewart LLP

(57) ABSTRACT

According to an embodiment, a liquid dispensing head includes a nozzle plate with a plurality of nozzles and a plurality of pressure chambers respectively communicating with the nozzles. A vibration plate is on a side of the pressure chambers opposite the nozzle plate. A supply-side flow path for liquid to be dispensed from the nozzle is on an inlet side of the plurality of pressure chambers. A discharge-side flow path for the liquid is on an outlet side of the pressure chambers. Piezoelectric elements are positioned to vibrate the vibration plate to change a volume of the pressure chambers for ejecting (dispensing) the liquid from the plurality of nozzles. The supply-side flow path is set to have a flow path resistance that is the same as a flow path resistance of the discharge-side flow-path.

20 Claims, 4 Drawing Sheets

LIQUID DISPENSING HEAD

CROSS-REFERENCE TO RELATED APPLICATION

This application is based upon and claims the benefit of priority from Japanese Patent Application No. 2022-134889, filed Aug. 26, 2022, the entire contents of which are incorporated herein by reference.

FIELD

Embodiments described herein relate generally to a liquid dispensing head.

BACKGROUND

As one type of ink jet head, there is a circulation type ink jet head that uses a stacked piezoelectric body and circulates ink along an ink flow path on a back side of a nozzle. In such a flow path structure, the flow path for supplying the ink and the flow path for discharging the ink are typically asymmetrical with respect to the nozzle.

In such an ink jet head, the flow path resistance is thus biased due to the difference between the supply-side flow path and the discharge-side flow path, and thus it is difficult to control the pressure at the nozzle, which is generally controlled to be negative with respect to the atmospheric pressure.

DETAILED DESCRIPTION

In general, according to one embodiment, a liquid dispensing head facilitating control of pressure for a nozzle is described.

According to one embodiment, a liquid dispensing head includes a nozzle plate with a plurality of nozzles and a plurality of pressure chambers respectively communicating with the nozzles. A vibration plate is on a side of the pressure chambers opposite the nozzle plate. A supply-side flow path for liquid to be dispensed from the nozzle is on an inlet side of the plurality of pressure chambers. A discharge-side flow path for the liquid is on an outlet side of the pressure chambers. Piezoelectric elements are positioned to vibrate the vibration plate to change a volume of the pressure chambers for ejecting (dispensing) the liquid from the plurality of nozzles. The supply-side flow path is set to have a flow path resistance that is the same as a flow path resistance of the discharge-side flow-path.

Figure 1:
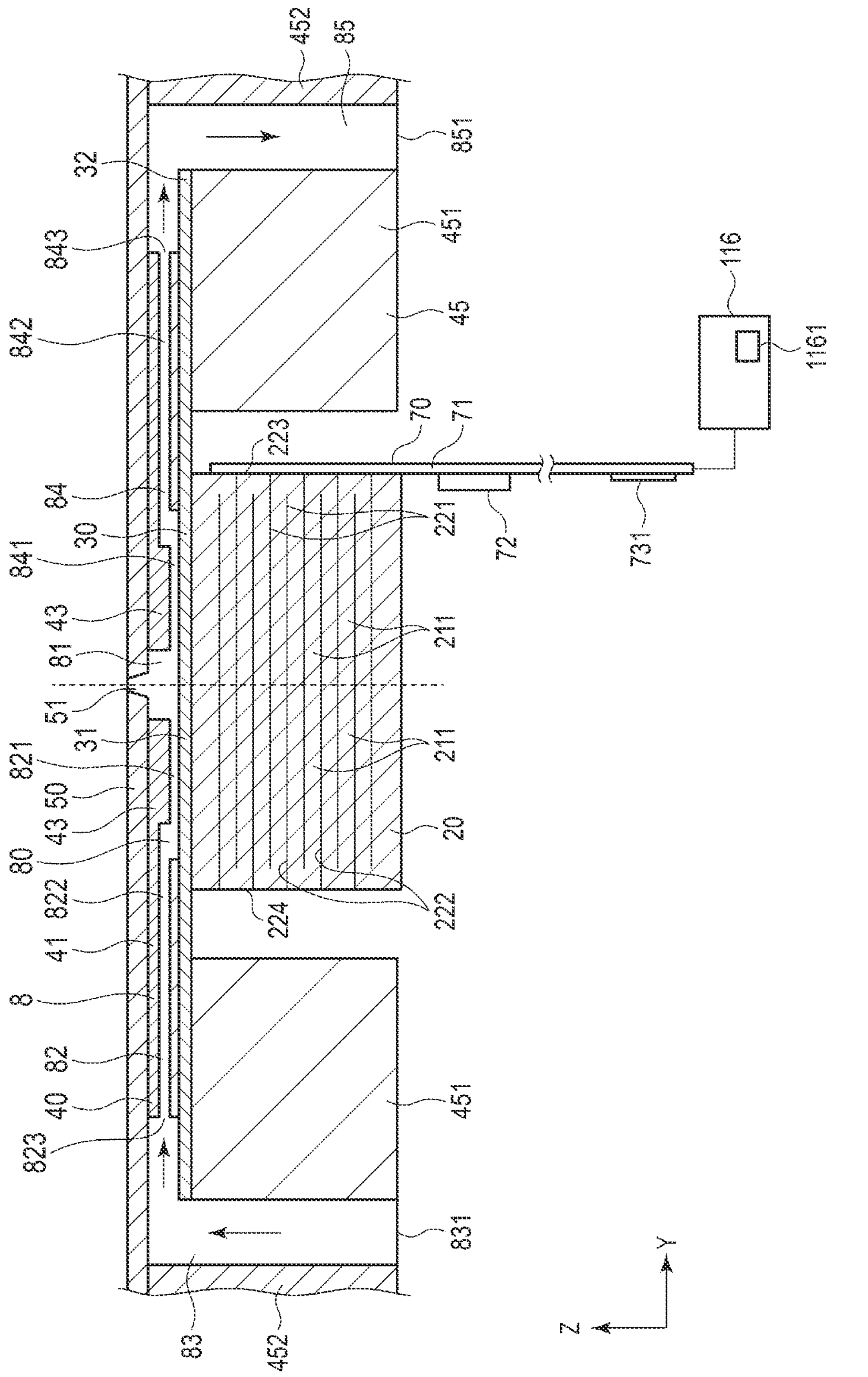
FIG. 1 is a cross-sectional view of an ink jet head according to a first embodiment.
Figure 2:
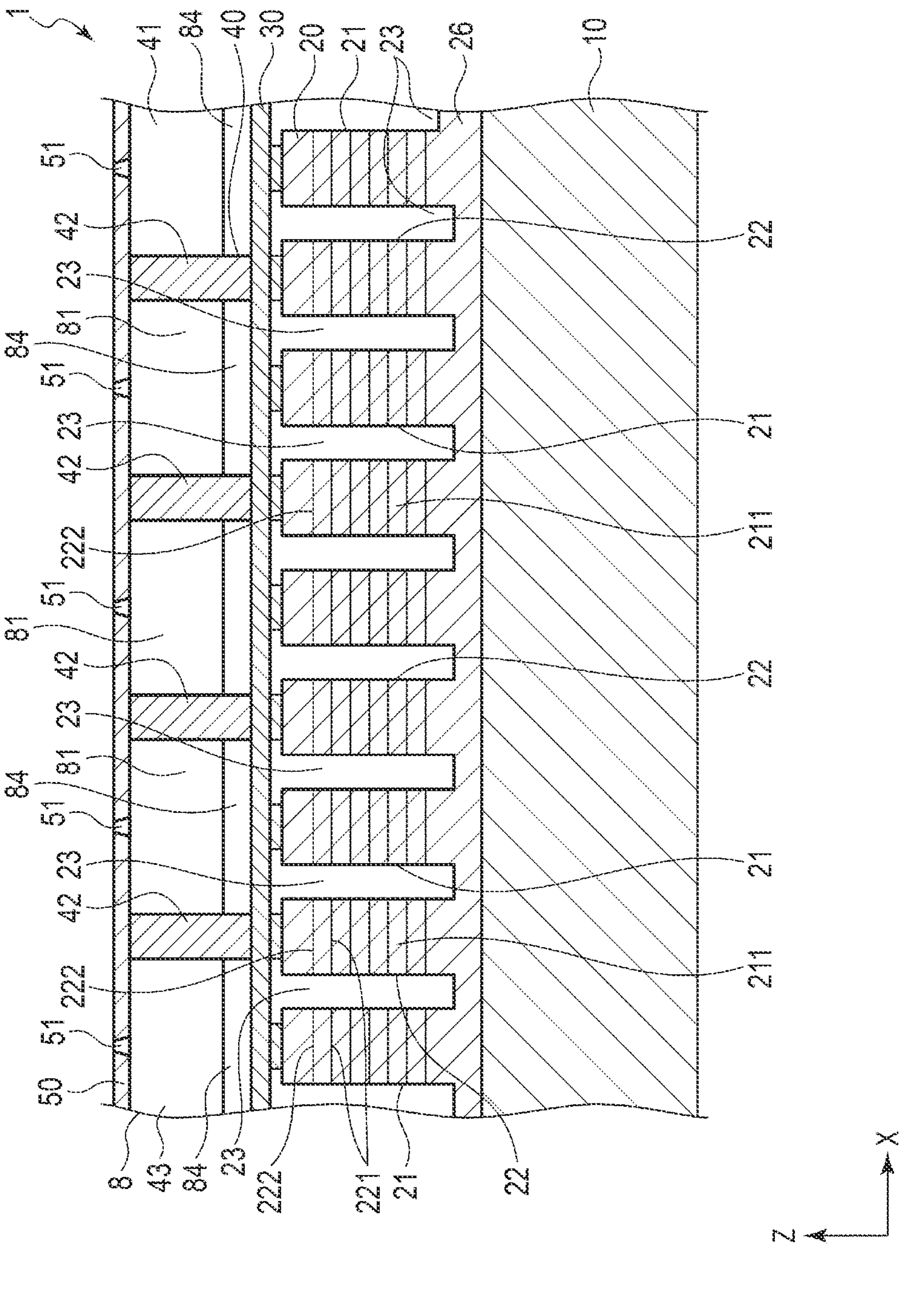
FIG. 2 is another cross-sectional view of an ink jet head according to a first embodiment.
Figure 3:
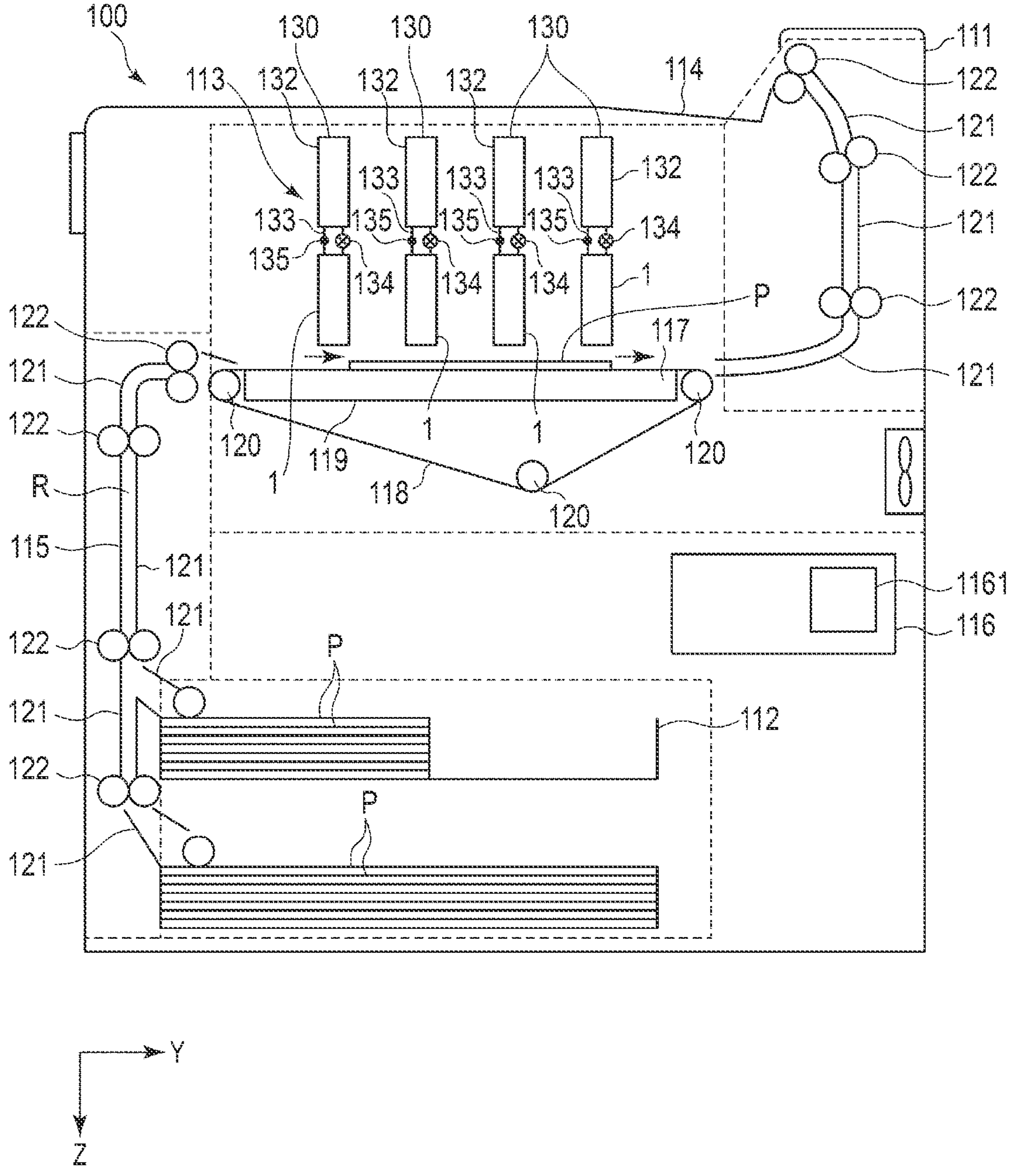
FIG. 3 is a diagram illustrating a schematic configuration of an ink jet recording device incorporating an ink jet head according to a first embodiment.
Figure 4:
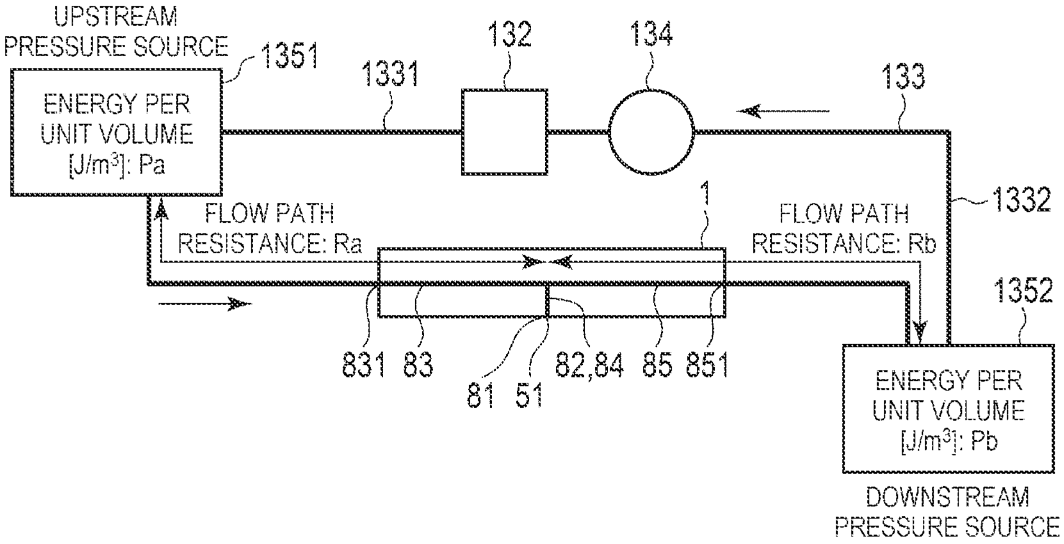
FIG. 4 is a diagram illustrating a circulation flow path for an ink jet head according to a first embodiment.
Figure 5:
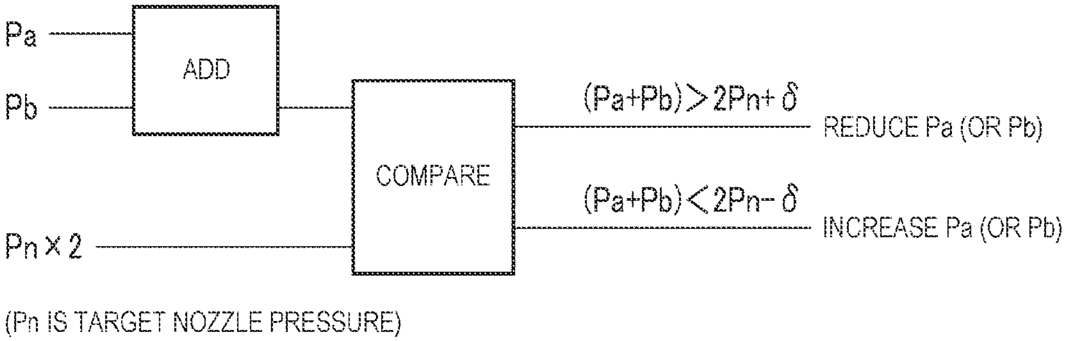
FIG. 5 is a diagram illustrating pressure control for a circulation flow path for an ink jet head according to a first embodiment.

Hereinafter, an ink jet head 1 (as one example of a liquid dispensing head) and an ink jet recording device 100 (as one example of a liquid dispensing device) will be described with reference to FIGS. 1 to 5. FIGS. 1 and 2 are cross-sectional views showing a schematic configuration of the ink jet head 1. FIG. 3 is a diagram illustrating a schematic configuration of the ink jet recording device 100, and FIG. 4 is a diagram illustrating a circulation (recirculating) flow path for the ink jet head 1. FIG. 5 is a diagram illustrating negative pressure control for the circulation flow path depicted in FIG. 4. In the present disclosure, the X-direction taken as parallel to a plane in which nozzles 51 are arranged, the Y-direction is also parallel to this plane and intersecting the X-direction, and the Z-direction is an axial direction of the nozzles 51. In the drawings, configurations, elements, aspects or the like may be enlarged, reduced, or omitted as appropriate for the sake of description.

As shown in FIGS. 1 and 2, the ink jet head 1 includes a base 10, an actuator portion 20, a vibration plate 30, a flow path portion 40 (formed by a flow path substrate 41 and a frame portion 45), a nozzle plate 50 including therein a plurality of nozzles 51, and a drive circuit 70. In the present embodiment, an ink jet head 1 in which a stacking direction of piezoelectric layers 211, a vibration direction of a piezoelectric element 21, and a vibration direction of the vibration plate 30 are all along the Z direction is shown as a non-limiting example. In the present embodiment, in the flow path portion 40 on a back side of the nozzle plate 50, the vibration plate 30 and the flow path portion 40 form a flow path structure portion 8 corresponding to a head flow path 80.

The actuator portion 20 is formed of, for example, a piezoelectric material, and includes a plurality of driving piezoelectric elements 21 and a plurality of non-driving piezoelectric elements 22 alternately disposed along a row direction, and a piezoelectric structure portion 26 connecting the plurality of piezoelectric elements 21 and 22. In the present embodiment, each nozzle 51 is provided at a center of an actuator portion 20 along the Y-direction, and the actuator portion 20 has a lengthwise structure symmetrical with respect to the nozzle 51. The actuator portion 20 is bonded to one side of the base 10. The actuator portion 20 is provided, for example, on the base 10.

In the actuator portion 20, the driving piezoelectric elements 21 and the non-driving piezoelectric elements 22 are disposed at regular intervals along the X-direction. As an example, the driving piezoelectric elements 21 and the non-driving piezoelectric elements 22 are each formed in a rectangular parallelepiped columnar shape having the same outer shape. The actuator portion 20 is divided into a plurality of portions by a plurality of grooves 23 to form the plurality of driving piezoelectric elements 21 and the plurality of non-driving piezoelectric elements 22, which are all disposed side by side in the row direction at the same pitch since the grooves 23 each have the same width.

For example, the plurality of driving piezoelectric elements 21 and the plurality of non-driving piezoelectric elements 22 are each formed in a rectangular shape such that a lateral direction is along the row direction (X-direction) and a longitudinal direction is along the Y-direction in a plan view as viewed from the Z direction, which is the axial direction of the nozzle.

The driving piezoelectric elements 21 are disposed at positions respectively facing the plurality of pressure chambers 81 in the Z direction. As an example, center positions of the driving piezoelectric elements 21 in the row direction and the Y-direction and center positions of the pressure chambers 81 in the row direction and the Y-direction are aligned with each other (overlapping) in the Z direction.

The non-driving piezoelectric elements 22 are disposed at positions respectively facing partition wall portions 42 in the Z direction. As an example, center positions of the non-driving piezoelectric elements 22 in the row direction and the Y-direction and center positions of the partition wall portions 42 in the row direction and the Y-direction are aligned in the Z direction.

For example, a stacked piezoelectric member constituting the actuator portion 20 is formed by stacking and sintering layers of piezoelectric materials. In the actuator portion 20, a plurality of piezoelectric elements (each formed in a rectangular columnar shape) are formed at predetermined intervals when the stacked piezoelectric member is subjected to dicing processing to form the grooves 23. Then, electrodes and the like are provided for the plurality of formed columnar elements. The plurality of driving piezoelectric elements 21 and the plurality of non-driving piezoelectric elements 22 are thus formed. The plurality of driving piezoelectric elements 21 and the plurality of non-driving piezoelectric elements 22 are alternately disposed in parallel with a groove 23 interposed therebetween otherwise adjacent elements in the row direction.

The piezoelectric members forming the driving piezoelectric elements 21 and the non-driving piezoelectric elements 22 are, for example, stacked piezoelectric bodies. The driving piezoelectric elements 21 and the non-driving piezoelectric elements 22 each include a plurality of stacked piezoelectric layers 211, and internal electrodes 221 and 222 formed on main surfaces of the piezoelectric layers 211. As an example, the driving piezoelectric elements 21 and the non-driving piezoelectric elements 22 have the same stacked structure. The driving piezoelectric elements 21 and the non-driving piezoelectric elements 22 include external electrodes 223 and 224 formed on surfaces thereof.

Each piezoelectric layer 211 is formed of a piezoelectric material such as a lead zirconate titanate (PZT)-based piezoelectric material or a lead-free sodium potassium niobate (KNN)-based piezoelectric material, and is formed into a thin plate shape. A plurality of piezoelectric layers 211 are stacked and bonded to one another. For example, in the present embodiment, the layer thickness direction and the layer stacking direction of the piezoelectric layers 211 are disposed along a vibration direction (Z direction).

The internal electrodes 221 and 222 are conductive films formed of a conductive material such as silver-palladium that can be fired and formed into a predetermined shape. The internal electrodes 221 and 222 are formed in predetermined regions on the main surfaces of the piezoelectric layers 211. The internal electrodes 221 and 222 have different polarities from each other. For example, each internal electrode 221 is formed in a region near an end of the piezoelectric layer 211 but not reaching the other end of the piezoelectric layer 211 in the extending direction (Y-direction). Each internal electrode 222 is formed in an end region of the piezoelectric layer 211 on the opposite end of the piezoelectric layer 211 in the Y-direction from the internal electrodes 22 but not reaching the other end region of the piezoelectric layer 211. The internal electrodes 221 and 222 are connected to the external electrodes 223 and 224 formed on opposite side surfaces of the piezoelectric elements 21 and 22, respectively.

The stacked piezoelectric layers forming the driving piezoelectric elements 21 and the non-driving piezoelectric elements 22 may further include dummy layers on either on either the upper end or the lower end. For example, the dummy layer can be formed of the same material as the piezoelectric layer 211, but has an electrode only on one side, and thus does not deform because an electric field is not applied. A dummy layer does not function as an active part of the piezoelectric body, but may serves as a base portion for fixing the actuator portion 20 to the base 10, or as polishing margin in polishing processing that is used in manufacturing to achieve final dimensional accuracy or the like.

The external electrodes 223 and 224 are formed on the surfaces of the plurality of driving piezoelectric elements 21 and the plurality of non-driving piezoelectric elements 22, and are implemented by collecting end portions of the internal electrodes 221 and 222. For example, the external electrodes 223 and 224 are respectively formed on opposite end surfaces of the piezoelectric layer 211 in the extending direction. The external electrodes 223 and 224 can be formed of nickel (Ni), chromium (Cr), gold (Au), or the like by a known method such as a plating method or a sputtering method. The external electrode 223 and the external electrode 224 have different polarities from each other. The external electrode 223 and the external electrode 224 are disposed on different side surfaces of the driving piezoelectric elements 21 and the non-driving piezoelectric elements 22, respectively. In some examples, external electrodes 223 and 224 may be disposed in different regions on the same sides of the driving piezoelectric elements 21 and the non-driving piezoelectric elements 22.

In the present embodiment, the external electrode 223 functions as an individual electrode, and the external electrode 224 functions as a common electrode. Electrode layers of the external electrodes 223 (which serve as the individual electrodes) are divided by the grooves 23, and are disposed independently of each other (that is electrically distinct from one another). Electrode layers of the external electrodes 224 (which serve as the common electrode) are all connected to one another on a side surface of the piezoelectric structure portion 26 and, for example, are ground voltage terminals. The external electrodes 223 and 224 are connected to the drive circuit 70 via, for example, wiring films (e.g., flexible circuit boards/substrates). The external electrodes 223 and 224 are connected to a control unit 116 (serving as a drive unit) via a drive IC 72 of the drive circuit 70, and perform drive control under control of a control circuit 1161. In other examples, the arrangement of the common electrode and the individual electrode may be reversed.

The vibration direction of each of the piezoelectric elements 21 and 22 is along the stacking direction (Z-direction, as depicted in this example). The piezoelectric elements 21 and 22 displaced in a d33 direction by applying an electric field. In each of the piezoelectric elements 21 and 22, the number of stacked piezoelectric layers 211 and internal electrodes 221 and 222 is three or more. For example, each of the piezoelectric elements 21 and 22 has three or more layers but 50 or less layers. In this example, the thickness of each layer is 10 μm to 40 μm. The layer thickness (e.g., average layer thickness) multiplied by the total number of stacked layers is less than 1000 μm.

In the ink jet head 1, the driving piezoelectric element 21 vibrates when a voltage is applied across the internal electrodes 221 and 222 via the external electrodes 223 and 224. In the present embodiment, the driving piezoelectric element 21 performs longitudinal vibration along the stacking direction of the piezoelectric layers 211. The longitudinal vibration here is, for example, "vibration in the thickness direction defined by a piezoelectric constant d33". The driving piezoelectric element 21 displaces the vibration plate 30 by longitudinal vibration and deforms the pressure chamber 81.

The vibration plate 30 extends along a plane orthogonal to the Z direction and is bonded to one side of the piezoelectric layers 211 in piezoelectric elements 21 and 22, that is, on a surface on the nozzle plate 50 side. The vibration plate 30 faces the plurality of nozzles 51 via the pressure chambers 81. The vibration plate 30 is, for example, deformable or flexible at least in relevant portions. The vibration plate 30 is bonded to the driving piezoelectric elements 21 and the non-driving piezoelectric elements 22 of the actuator portion 20 and the frame portion 45. For example, the vibration plate 30 includes a vibration region 31 facing the piezoelectric elements 21 and 22 and a support region 32 facing the frame portion 45. The vibration plate 30 is provided between the flow path substrate 41 and the actuator portion 20.

The vibration region 31 has, for example, a flat plate shape and is disposed such that its thickness direction is aligned with the vibration direction of the piezoelectric layer 211. The vibration plate 30 is, for example, a metal plate. The vibration plate 30 has a plurality of vibration portions which face the respective pressure chambers 81 and can be displaced individually. The vibration plate 30 can be formed by connecting the plurality of vibration portions.

For example, the vibration plate 30 can be formed of a nickel plate or a stainless steel (SUS) plate with a thickness of about 5 μm to 15 μm. In the vibration region 31, a fold, a crease, or a step may be formed at a portion adjacent to the vibration portion or between vibration portions adjacent to each other such that vibration portions can be more easily displaced. The vibration region 31 is deformed by expansion and compression of the corresponding driving piezoelectric element 21. Since the vibration plate 30 typically requires a very thin and complicated shape, the vibration plate 30 may be formed by an electroforming method, or the like. The vibration plate 30 is bonded to an upper end surface of the actuator portion 20.

The support region 32 is a plate-shaped member disposed between the frame portion 45 and the flow path substrate 41. The vibration plate 30 has a structure which is symmetrical with respect to the nozzle 51 in the Y-direction.

The flow path portion 40 is formed by the flow path substrate 41 (provided between the vibration plate 30 and the nozzle plate 50) and the frame portion 45 (provided on an outer periphery of the actuator portion 20).

The flow path substrate 41 includes the plurality of partition wall portions 42, that separate a plurality of individual flow paths from one another, and guide walls 43 that form the individual flow paths.

For example, the partition wall portion 42 is a wall that separates pressure chambers 81 disposed side by side and separates individual flow paths disposed side by side. The partition wall portion 42 is disposed to face the non-driving piezoelectric element 22 via the vibration plate 30 and is thus supported by the non-driving piezoelectric element 22.

The guide wall 43 is a wall that forms a supply-side individual flow path 82 and a discharge-side individual flow path 84. The guide wall 43 may include a step portion that narrows a flow path cross-sectional area at a predetermined position to form narrowed flow paths 822 and 842.

The flow path substrate 41 has a structure in which Y direction ends are symmetrical with respect to the nozzle 51. Specifically, the plurality of partition wall portions 42 have a structure symmetrical with respect to the nozzle 51, and for example, the plurality of partition wall portions 42 extend along the Y direction and have a uniform cross-sectional shape orthogonal to the Y direction. In addition, the guide walls 43 each have a structure along the Y direction that is symmetrical with respect to the nozzle 51. For example, the guide walls 43 extend along the Y direction, and a cross-sectional shape thereof orthogonal to the Y direction has the same shape at the same position from the nozzle 51 along the Y direction.

The frame portion 45 is a structure bonded to the vibration plate 30 together with the piezoelectric elements 21 and 22. In the present embodiment, the frame portion 45 is disposed adjacent to the actuator portion 20, and forms an outer wall of the ink jet head 1.

In the present embodiment, the frame portion 45 includes an inner frame 451 bonded to a back side of the vibration plate 30 and an outer frame 452 bonded to the back side of the nozzle plate 50. The vibration plate 30 and the flow path substrate 41 together help form a supply-side common chamber 83 and a discharge-side common chamber 85 on the back side of the nozzle plate 50. For example, a part of the supply-side common chamber 83 and a part of the discharge-side common chamber 85 are formed between the inner frame 451 and the outer frame 452. The frame portion 45 has a structure along the Y direction symmetrical with respect to the nozzle 51.

The supply-side common chamber 83 and the discharge-side common chamber 85 are formed within region surrounded by the frame portion 45. The supply-side common chamber 83 communicates with (connects to) the pressure chamber 81 through the supply-side individual flow path 82. The discharge-side common chamber 85 communicates with (connects to) the pressure chamber 81 through the discharge-side individual flow path 84.

In the present embodiment, the head flow path 80 is formed in the ink jet head 1 by the vibration plate 30 and the flow path portion 40. The head flow path 80 includes the plurality of pressure chambers 81, a supply-side flow path, and a discharge-side flow path. The supply-side flow path includes a plurality of supply-side individual flow paths 82 extending in one direction and the supply-side common chamber 83 connected to the plurality of supply-side individual flow paths 82 on one side. The discharge-side flow path includes a plurality of discharge-side individual flow paths 84 extending in the other direction and the discharge-side common chamber 85 communicating with the plurality of discharge-side individual flow paths 84 on the other side. In the present embodiment, when viewed from the Z direction, the supply-side individual flow path 82, the pressure chamber 81, and the discharge-side individual flow path 84 are disposed side by side in a flow direction (corresponding in this instance to the Y-direction).

The plurality of pressure chambers 81 are spaces formed on one side of the vibration region 31 of the vibration plate 30, and each respectively communicates with the supply-side common chamber 83 and the discharge-side common chamber 85 via the supply-side individual flow paths 82 and the discharge-side individual flow paths 84. The pressure chambers 81 are separated from each other by the partition wall portions 42. That is, sidewalls of the pressure chambers 81 are formed by the partition wall portions 42. Further, each pressure chamber 81 communicates with a nozzle 51. The pressure chamber 81 is enclosed by the vibration plate 30 on an opposite side from the nozzle plate 50. The pressure chamber 81 is deformed by the vibration of the vibration plate 30 forming a part of the pressure chamber 81 for dispensing (ejecting) a liquid from the nozzle 51.

Each supply-side individual flow path 82 communicates with a pressure chamber 81 on the supply side and extends in the Y direction. The supply-side individual flow path 82 includes a supply-side pressure flow path 821 and a supply-side narrowed flow path 822. The supply-side narrowed flow path 822 has a flow path cross section narrower than that of the supply-side common chamber 83.

The supply-side common chamber 83 serves as a flow path communicating with all of supply-side individual flow paths 82. The supply-side common chamber 83 includes, for example, a flow path portion that is formed between the vibration plate 30 and the nozzle plate 50 and is long in the X direction, and another flow path portion between the frame portion 45 and the end portions of the flow path substrate 41 and reaches a head inlet 831. These flow path portions are continuous with each other.

The discharge-side individual flow path 84 communicates with each pressure chamber 81 on the discharge side and extends in the Y direction. The discharge-side individual flow path 84 includes a discharge-side pressure flow path 841 and a discharge-side narrowed flow path 842 having a flow path cross section narrower than that of the discharge-side common chamber 85. As depicted, the flow path substrate 41 has a structure along the Y direction that is symmetrical with respect to the nozzle 51, thus the supply-side pressure flow path 821 and the discharge-side pressure flow path 841 have the same flow path length along the Y direction and the same flow path cross-sectional shape orthogonal to the Y direction. Likewise, the supply-side narrowed flow path 822 and the discharge-side narrowed flow path 842 have the same flow path length along the Y direction and the same flow path cross-sectional shape orthogonal to the Y direction.

The discharge-side common chamber 85 serves as a flow path communicating with all of the plurality of discharge-side individual flow paths 84. The discharge-side common chamber 85 includes, for example, a flow path portion that is formed between the vibration plate 30 and the nozzle plate 50 and is long in the X direction, and a flow path portion between the frame portion 45 and the end portions of the flow path substrate 41 and reaches a head outlet 851. These flow path portions are continuously with each other.

In the flow path structure portion 8 forming the head flow path 80, a structure on the supply side on one side in the Y direction and a structure on the discharge side on the other side in the Y direction are symmetrical with respect to the nozzle 51. That is, the flow path substrate 41 and the frame portion 45 on one side in the extending direction and the flow path substrate 41 and the frame portion 45 on the other side in the extending direction are symmetrical with respect to the nozzle 51. Accordingly, in the head flow path 80, a supply-side flow path resistance RI (flow resistance) and a discharge-side flow path resistance RE are equal. As an example, a shape from the nozzle 51 to the supply-side narrowed flow path 822 via the supply-side pressure flow path 821 is symmetrical to a shape from the nozzle 51 to the discharge-side narrowed flow path 842 via the discharge-side pressure flow path 841. Preferably, a structure up to an inlet of the supply-side common chamber 83 serving as the head inlet 831 and a structure up to an outlet of the discharge-side common chamber 85 forming the head outlet 851 are also symmetrical with respect to the nozzle 51.

The nozzle plate 50 is formed in a rectangular plate shape having a thickness of about 10 μm to 100 μm and may be made of a metal such as SUS or Ni, or a resin material such as polyimide. The nozzle plate 50 is disposed on one side of the flow path substrate 41 so as to cover an opening of the pressure chamber 81.

A plurality of nozzles 51 are disposed side by side in a first direction, which matches the arrangement direction of the pressure chambers 81, to form a nozzle row. For example, the nozzles 51 are respectively provided at positions corresponding to the plurality of pressure chambers 81. In the present embodiment, the nozzles 51 are provided at the centers (middles) of the pressure chambers 81 along the extending direction.

The drive circuit 70 includes a wiring film 71 having one end connected to the external electrodes 223 and 224, the drive IC 72 mounted on the wiring film 71, and a printed wiring board mounted on the other end of the wiring film 71.

The drive circuit 70 drives the driving piezoelectric element 21 by applying a drive voltage from the drive IC 72 to the external electrodes 223 and 224, which increases or decreases a volume of the pressure chamber 81, and thus causes droplets to be dispensed from the nozzle 51.

The wiring film 71 is connected to the external electrodes 223 and 224. For example, the wiring film 71 is an anisotropic conductive film (ACF) fixed to connection portions of the external electrodes 223 and 224 by thermocompression bonding or the like. The wiring film 71 is, for example, a chip on film (COF) on which the drive IC 72 is mounted as an electronic component.

The drive IC 72 is connected to the external electrodes 223 and 224 via the wiring film 71. The drive IC 72 is an electronic component used for control of liquid dispensing (dispensing control). The drive IC 72 may be connected to the external electrodes 223 and 224 by other methods such as anisotropic conductive paste (ACP), a non-conductive film (NCF), and non-conductive paste (NCP) instead of the wiring film 71.

The drive IC 72 generates a control signal and a driving signal for selectively operating each driving piezoelectric element 21. The drive IC 72 generates the control signal for controlling a timing of dispensing ink (or the like) and selecting the driving piezoelectric element(s) 21 to dispense the ink in accordance with an image signal received from the control unit 116 of the ink jet recording device 100 or the like. The drive IC 72 generates a voltage to be applied to the driving piezoelectric element 21, that is, the driving signal (electric signal) in accordance with a control signal from the control unit 116. When the drive IC 72 applies the driving signal to the driving piezoelectric element 21, the driving piezoelectric element 21 actuates to displace the vibration plate 30 and changes the volume of the pressure chamber 81. Accordingly, the ink in the pressure chamber 81 experiences a pressure vibration. The ink is dispensed (ejected) from the nozzle 51 of the pressure chamber 81 by the pressure vibration. The ink jet head 1 may provide a gradation expression (gray scaling) by changing a volume of ink droplets that land on one pixel. In some examples, the ink jet head 1 may change the number of ink droplets that land on one pixel by changing the number of times ink dispensing is performed per pixel. The drive IC 72 is an example of an application unit that applies a driving signal to the driving piezoelectric elements 21.

For example, the drive IC 72 includes a data buffer, a decoder, and a driver. The data buffer stores print data in time series for each driving piezoelectric element 21. The decoder controls the driver based on the print data stored in the data buffer for each driving piezoelectric element 21. The driver outputs the driving signal for operating each driving piezoelectric element 21 as necessary based on the control of the decoder. The driving signal is, for example, a voltage applied to the driving piezoelectric element 21.

The printed wiring board is, for example, a printed wiring assembly (PWA) on which various electronic components and connectors are mounted, and includes a head control circuit 731. The printed wiring board is connected to the control unit 116 of the ink jet recording device 100.

In the ink jet head 1, the nozzle plate 50, the frame portion 45, the flow path substrate 41, and the vibration plate 30 form the head flow path 80 including the plurality of pressure chambers 81 communicating with the nozzles 51, the plurality of supply-side individual flow paths 82 respectively communicating with the plurality of pressure chambers 81, the discharge-side individual flow paths 84 respectively communicating with the plurality of pressure chambers 81, the supply-side common chamber 83 communicating with the plurality of supply-side individual flow paths 82, and the discharge-side common chamber 85 communicating with the plurality of discharge-side individual flow paths 84. The head flow path 80 in this example is for a side shooter type ink flow path in which the ink flows from one side to the other side past the nozzle 51. For example, a circulation flow rate of the ink recirculating along the circulation flow path is set to 1/10 or more and 1/2 or less of a maximum flow rate of the ink dispensed from the nozzle 51.

The head flow path 80 can be formed such that the flow path resistance RI of the flow path on the supply side of the nozzle 51 is equal to the flow path resistance RE of the flow path on the discharge side of the nozzle 51. For example, the flow path resistance RI on the supply side from the head inlet 831 to the nozzle 51 via the supply-side common chamber 83, the supply-side individual flow path 82, and the pressure chamber 81 is equal to the flow path resistance RE on the discharge side from the nozzle 51 to the head outlet 851 via the pressure chamber 81, the discharge-side individual flow path 84, and the discharge-side common chamber 85.

In the present embodiment, a flow path shape from an end portion 823 of the supply-side narrowed flow path 822, (which is the inlet of the supply-side individual flow path 82) to the nozzle 51 via the supply-side pressure flow path 821 and a flow path shape from the nozzle 51 to an end portion 843 of the discharge-side narrowed flow path 842 (which is the outlet of the discharge-side individual flow path 84) via the discharge-side pressure flow path 841 are symmetrical with respect to the nozzle 51. More preferably, a structure of the flow path from the head inlet 831 of the ink jet head 1 to the nozzle 51 through the supply-side common chamber 83, the supply-side individual flow path 82, and the pressure chamber 81 and a structure of the flow path from the nozzle 51 to the head outlet 851 through the pressure chamber 81, the discharge-side individual flow path 84 and the discharge-side common chamber 85 are symmetrical with respect to the nozzle 51 along the flow direction.

For example, the supply-side common chamber 83 communicates with an ink tank such as a cartridge via a supply-side ink flow path, and the ink is supplied to the pressure chambers 81 via the supply-side common chamber 83. In addition, the discharge-side common chamber 85 communicates with an ink flow path on a collection side, and the ink discharged from the discharge-side common chamber 85 is returned to the ink tank through the ink flow path on the collection side and circulates. All the driving piezoelectric elements 21 are connected, so that the voltage can be applied by the wiring. In the ink jet head 1, for example, under the control of the control unit 116 of the ink jet recording device 100, the drive IC 72 applies the drive voltage to the electrodes 221 and 222, so that the driving piezoelectric element 21 as a driving target vibrates, for example, in the stacking direction, that is, in the thickness direction of each piezoelectric layer 211. That is, the driving piezoelectric element 21 performs the longitudinal vibration.

In the ink jet head 1, the drive voltage is applied to the internal electrodes 221 and 222 of the driving piezoelectric element 21 as the driving target, thereby selectively driving the driving piezoelectric element 21 as the driving target. By combining deformation in a tensile direction and deformation in a compression direction caused by the driving piezoelectric element 21 as the driving target, the vibration plate 30 is deformed, and the volume of the pressure chamber 81 is changed, so that the liquid is guided from the supply-side common chamber 83 and is dispensed from the nozzle 51.

Hereinafter, an example of the ink jet recording device 100 including the ink jet head 1 will be described with reference to FIGS. 3 to 5. FIG. 3 is a diagram illustrating a schematic configuration of an ink jet recording device or printer including the ink jet head. FIG. 4 is a diagram illustrating a circulation system for a circulation flow path including the ink jet head 1, and FIG. 5 is a diagram illustrating negative pressure control for the circulation flow path.

As shown in FIG. 3, the ink jet recording device 100 includes a housing 111, a medium supply unit 112, an image forming unit 113, a medium discharge unit 114, a conveyance device 115, and the control unit 116.

The ink jet recording device 100 is a liquid dispensing device that performs an image forming process on a sheet P by dispensing ink while conveying the sheet P serving as a recording medium along a predetermined conveyance path R from the medium supply unit 112 to the medium discharge unit 114 through the image forming unit 113.

The housing 111 constitutes an outer shell of the ink jet recording device 100. A discharge port through which the sheet P is discharged to the outside is provided at a predetermined position of the housing 111.

The medium supply unit 112 includes a plurality of paper feeding cassettes and can hold a plurality of stacked sheets P having various sizes.

The medium discharge unit 114 includes a sheet discharge tray that can hold the sheets P discharged from the discharge port.

The image forming unit 113 includes a support unit 117 that supports the sheet P and a plurality of head units 130 that are arranged above the support unit 117.

The support unit 117 includes a conveyance belt 118 provided in a loop shape, a support plate 119 that supports the conveyance belt 118 from a back side in a predetermined region where the image is formed on the sheet P, and a plurality of belt rollers 120 provided on the back side of the conveyance belt 118.

The support unit 117 supports the sheet P on a holding surface which is an upper surface of the conveyance belt 118 during the image formation, and conveys the sheet P to a downstream side by feeding the conveyance belt 118 at a predetermined timing by rotation of the belt rollers 120.

The head unit 130 includes a plurality (four in this example) of ink jet heads 1, ink tanks 132 respectively mounted on the ink jet heads 1, circulation flow paths 133 connecting the ink jet heads 1 and the respective ink tanks 132, supply pumps 134, and negative pressure control devices 135.

The present embodiment includes the ink jet heads 1 of four colors of cyan, magenta, yellow, and black, and the ink tanks 132 that respectively store inks of the respective colors. The ink tank 132 is connected to the ink jet head 1 via the circulation flow path 133. For example, the circulation flow path 133 includes a supply flow path 1331 and a collection flow path 1332. The ink tank 132, the supply pump 134, the negative pressure control device 135, and the ink jet head 1 are provided in the middle of the circulation flow path 133.

The supply pump 134 is, for example, a liquid feed pump implemented as a piezoelectric pump. The supply pump 134 is provided in the supply flow path 1331. The supply pump 134 is connected to the control circuit 1161 of the control unit 116 through a wiring and can be controlled by the control unit 116. The supply pump 134 supplies a liquid to the ink jet head 1.

The negative pressure control device 135 can be a pump or other pressure adjustment device connected to the ink tank 132 or provided on the circulation flow path 133, so that the ink supplied to nozzles 51 of the ink jet head 1 can be formed into a meniscus having a predetermined shape by control of pressure in the ink tank 132 or the circulation flow path 133 in accordance with water head values (hydrological head pressures) associated with the ink jet head 1 and the ink tank 132. In general, a negative pressure (relative to atmospheric pressure) is utilized in this context. FIG. 4 is a diagram illustrating a configuration of a circulation system for circulation flow path 133 passing through the ink jet head.

For example, the negative pressure control device 135 includes an upstream pressure source 1351 provided in the supply flow path 1331 and a downstream pressure source 1352 provided in the collection flow path 1332. The upstream pressure source 1351 and the downstream pressure source 1352 are, for example, pumps or pressure adjustment devices. Here, as described above, in the ink jet head 1, the flow path shapes on the supply side and the discharge side are symmetrical, and thus the supply-side flow path resistance RI and the discharge-side flow path resistance RE in the inkjet head 1 are substantially equal. Further, as shown in FIG. 4, a flow path resistance Ra on the supply side from the upstream pressure source 1351 to the nozzle 51 and a flow path resistance Rb from the nozzle 51 to the downstream pressure source 1352 are equal.

The conveyance device 115 conveys the sheet P along the conveyance path R from the medium supply unit 112 to the medium discharge unit 114 through the image forming unit 113. The conveyance device 115 includes a plurality of guide plate pairs 121 disposed along the conveyance path R, and a plurality of conveyance rollers 122.

Each of the plurality of guide plate pairs 121 includes a pair of plate members disposed to face to each other with the sheet P to be conveyed sandwiched therebetween, and thereby guides the sheet P along the conveyance path R.

The conveyance roller 122 is driven and rotated under the control of the control unit 116, thereby conveying the sheet P to the downstream along the conveyance path R. Sensors for detecting a state of sheet conveyance are disposed at various locations on the conveyance path R.

The control unit 116 includes the control circuit 1161 such as a central processing unit (CPU) that is a controller, a read only memory (ROM) that stores various programs and the like, a random access memory (RAM) that temporarily stores various variable data, image data, and the like, and an interface unit that inputs data from the outside and outputs data to the outside.

In the ink jet recording device 100, when the control unit 116 detects a print instruction by a user operating an operation input unit or user interface, the control unit 116 drives the conveyance device 115 to convey the sheet P and outputs a print signal to the head unit 130 at a predetermined timing to drive the ink jet head 1. The ink jet head 1 performs a dispensing operation of transmitting a driving signal to the drive IC 72 according to an image signal corresponding to image data, applying the drive voltage to the internal electrodes 221 and 222 to selectively drive the driving piezoelectric element 21 to cause vibration of the driving piezoelectric element 21 to change the volume of the pressure chamber 81 to dispense the ink from the nozzle 51, thereby forming an image on the sheet P held on the conveyance belt 118. In the liquid dispensing operation, the control unit 116 drives the supply pump 134 to supply the ink from the ink tank 132 to the supply-side common chamber 83 of the ink jet head 1.

Here, a driving operation for driving the ink jet head 1 will be described. The ink jet head 1 according to the present embodiment includes the driving piezoelectric elements 21 disposed to face the pressure chamber 81, and the driving piezoelectric elements 21 are connected by the wiring so that a voltage can be applied thereto. The control unit 116 transmits the driving signal to the drive IC 72 according to an image signal corresponding to the image data, and applies the drive voltage to the internal electrodes 221 and 222, thereby selectively deforming the driving piezoelectric element(s) 21. By combining deformation in the tensile direction and deformation in the compression direction of the vibration plate 30, the volume of the pressure chamber 81 is changed, thereby dispensing the liquid.

For example, the control unit 116 alternately performs a pulling (expanding) operation and a compressing operation. In the ink jet head 1, during the pulling operation to increase the internal volume of the target pressure chamber 81, the respective driving piezoelectric element 21 for the target pressure chamber 81 contracts and the driving piezoelectric elements 21 which are not being driven are not deformed. During the compressing operation to reduce the internal volume of the target pressure chamber 81, the target driving piezoelectric element 21 is expanded. The non-driving piezoelectric element 22 is not deformed.

Here, as shown in FIG. 4, when energy per unit volume of the upstream pressure source 1351 is value Pa and energy per unit volume of the downstream pressure source 1352 is value Pb, a target nozzle pressure Pn, which is a pressure in the vicinity of the nozzle 51, can be calculated according to the flow path resistance and is the value obtained by dividing values Pa and Pb by the flow path resistance.

When the dispensing is not to be performed, the nozzle pressure Pn is considered as follows.

When a flow path resistance ratio is Ra:Rb=1:r, the values Pa and Pb may be controlled (adjusted) to satisfy a relationship:

$$Pa \cdot r/(1+r)+Pb/(1+r)=Pn \quad \text{(Equation 1)}$$

In this context, an appropriate value for the nozzle pressure Pn is about −1 kilopascal (Pn≈−1 kPa).

Therefore, since the above formula (Equation 1) depends only on the “ratio” of the flow path resistances, the pressure in the vicinity of the nozzle does not change even when an ambient temperature or the type of ink changes and the absolute values for the flow path resistances change.

Accordingly, by increasing or decreasing the circulation flow rate while maintaining the state of above Equation 1, the circulation flow rate can be changed and the circulation can be stopped while still maintaining the preferred pressure in the vicinity of the nozzle.

In particular, when the flow structures in the inkjet head 1 are symmetrical and r=1 as in the present embodiment, then the following equation may be satisfied: (Pa+Pb)/2=Pn (Equation 2).

When the supply-side flow path resistance RI and the discharge-side flow path resistance RE are equal to each other, the nozzle pressure Pn can be easily obtained from the upstream pressure Pa and the downstream pressure Pb by Equation 2, and thus the value of nozzle pressure Pn can be controlled with a simple controller configuration. For example, as shown in FIG. 5, the sum of Pa and Pb can be compared to Pn×2, and if $(Pa+Pb)>2Pn+\delta$, control may be performed to reduce Pa or Pb, and if $(Pa+Pb)<2Pn-\delta$, control may be performed to increase Pa or Pb, thereby facilitating the negative pressure control. Note that $\delta$ is hysteresis (insensitive zone) value provided in this context so that the pressure adjustment (control) does not frequently occur in response to a slight ($\pm\delta$ or less) pressure change. The value for $\delta$ can be set to permit an allowable/tolerable pressure change width according to other operating parameters or criteria for the ink jet recording device 100.

According to the ink jet head 1 and the ink jet recording device 100 according to the present embodiment, by making the supply-side flow path resistance RI and the discharge-side flow path resistance RE equal for the ink jet head 1, the nozzle pressure can be simply calculated from the upstream pressure and the downstream pressure as for Equation 2, and the nozzle pressure control can be thus performed with a simple controller configuration or the like.

Furthermore, since the supply-side individual flow path 82, the discharge-side individual flow path 84, and the pressure chamber 81, are disposed along the ink flow direction, stagnation of the ink will be small, and pigment sedimentation out of the ink will be less likely to occur. In addition, since the pressure flow paths and the narrowed flow paths on the supply side and the discharge side have the symmetrical structures, resonance of the ink is sharp, and the ink can be dispensed using the pressure vibration with high efficiency.

Accordingly, it is possible to obtain effects such as preventing deterioration of dispensing performance due to deterioration of the ink in the vicinity of the nozzles, and thus avoiding non-uniformity between different nozzles 51 due resistance variation of the narrowed flow paths and the circulation flow rates.

For example, when a circulation flow rate exceeds a maximum flow rate of the dispensed ink, a difference occurs in nozzle back pressure due to slight asymmetry of the shapes between the supply-side narrowed flow path and the discharge-side narrowed flow path. As a result, the meniscus shape becomes different for each nozzle 51, and thus the uniformity of printing may be deteriorated and printing quality may be deteriorated. However, by setting the circulation flow rate to be equal to or less than ½ of the maximum flow rate of the dispensed ink, a change in the nozzle back pressure depending on a non-target of the narrowed flow path can be made smaller than a change in the nozzle back pressure depending on presence or absence of the dispensing. Accordingly, by setting the circulation flow rate to ½ or less of the maximum flow rate of the dispensed ink, deterioration in the printing quality can be prevented. On the other hand, when the circulation flow rate is too low, the deterioration in the discharge performance cannot be prevented, but by setting the circulation flow rate to be 1/10 or more of the maximum flow rate for the dispensed ink, the deterioration in the discharge performance can be prevented.

The disclosure is not limited to the embodiment described above and can be modified in various manners in practice without departing from the gist of the present disclosure.

The specific materials and configurations of the piezoelectric elements 21 and 22 of the above embodiment are not limited to those described above. A heat resistant temperature and an upper limit voltage of the electronic component are also appropriately variable according to a material and performance of the component.

In an embodiment, a plurality of piezoelectric layers are stacked, and the driving piezoelectric element 21 is driven using the longitudinal vibration (d33) in the stacking direction, but the disclosure is not limited thereto. For example, a driving piezoelectric element 21 may be constituted by a single layer of a piezoelectric material and/or the driving piezoelectric element 21 may be driven by lateral vibration that displaces the driving piezoelectric element 21 in a d31 direction as shown in FIG. 4.

The arrangement of the nozzles 51 and the pressure chambers 81 is not limited to the above embodiment. For example, two or more rows of nozzles 51 may be disposed. Air chambers serving as dummy chambers may be formed among the plurality of pressure chambers 81.

In addition, the configurations and positional relationships of the various components including the vibration plate 30, the flow path substrate 41, the nozzle plate 50, and the frame portion 45 are not limited to the above-described embodiment, and can be appropriately changed in various aspects.

The liquid to be dispensed is not limited to ink for printing, and an apparatus that dispenses a liquid containing conductive particles for forming a wiring pattern of a printed wiring board is another embodiment.

In an embodiment, the ink jet head 1 can be used in, for example, 3D printers, industrial manufacturing machines, and medical applications, and can have a reduced size, weight, and cost as compared to existing alternatives.

In addition, the embodiment has been described, but the embodiment is presented only as an example, and is not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A liquid dispensing head, comprising:
- a nozzle plate with a plurality of nozzles;
- a plurality of pressure chambers respectively communicating with the plurality of nozzles;
- a vibration plate disposed on a side of the plurality of pressure chambers opposite the nozzle plate;
- a supply-side flow path on an inlet side of the plurality of pressure chambers;
- a discharge-side flow path on an outlet side of the pressure chambers; and
- a plurality of piezoelectric elements positioned to vibrate the vibration plate to change a volume of the plurality of pressure chambers for ejecting a liquid from the plurality of nozzles, wherein
- the supply-side flow path has a flow path resistance that is the same as a flow path resistance of the discharge-side flow-path.

2. The liquid dispensing head according to claim 1, further comprising:
- a circulation system configured to circulate the liquid on a circulation flow path including the supply-side flow path, the plurality of pressure chambers, and the discharge-side flow path.

3. The liquid dispensing head according to claim 1, further comprising:

a flow path substrate including wall members forming the supply-side flow path and the discharge-side flow path, wherein the supply-side flow path includes supply-side individual flow paths connecting to the pressure chambers and a supply-side common chamber connecting to the plurality of supply-side individual flow paths, the discharge-side flow path includes discharge-side individual flow paths connecting to the pressure chambers and a discharge-side common chamber connecting to the plurality of discharge-side individual flow paths, and the supply-side individual flow paths and the discharge-side individual flow paths are symmetrical.

4. The liquid dispensing head according to claim 3, wherein the supply-side individual flow path includes a supply-side pressure flow path and a supply-side narrowed flow path, the discharge-side individual flow path includes a discharge-side pressure flow path and a discharge-side narrowed flow path, and the supply-side individual flow path, the pressure chamber, and the discharge-side individual flow path are disposed in order along a first direction.

5. The liquid dispensing head according to claim 4, wherein the supply-side pressure flow path and the discharge-side pressure flow path have a same length in the first direction and a same cross-sectional shape orthogonal to the first direction, and the supply-side narrowed flow path and the discharge-side narrowed flow path have a same length in the first direction and a same cross-sectional shape orthogonal to the first direction.

6. The liquid dispensing head according to claim 1, further comprising:

a circulation system configured to circulate the liquid on a circulation flow path including the supply-side flow path, the plurality of pressure chambers, and the discharge-side flow path, wherein the circulation system is configured to control a flow rate of the liquid on the circulation flow path to be in a range of $1/10$ to $1/2$ of a maximum flow rate of the liquid from the plurality of nozzles.

7. The liquid dispensing head according to claim 6, further comprising:

a flow path substrate including wall members forming the supply-side flow path and the discharge-side flow path, wherein the supply-side flow path includes supply-side individual flow paths connecting to the pressure chambers and a supply-side common chamber connecting to the plurality of supply-side individual flow paths, the discharge-side flow path includes discharge-side individual flow paths connecting to the pressure chambers and a discharge-side common chamber connecting to the plurality of discharge-side individual flow paths, and the supply-side individual flow paths and the discharge-side individual flow paths are symmetrical.

8. The liquid dispensing head according to claim 7, wherein the supply-side individual flow path includes a supply-side pressure flow path and a supply-side narrowed flow path, the discharge-side individual flow path includes a discharge-side pressure flow path and a discharge-side narrowed flow path, and the supply-side individual flow path, the pressure chamber, and the discharge-side individual flow path are disposed in order along a first direction.

9. The liquid dispensing head according to claim 8, wherein the supply-side pressure flow path and the discharge-side pressure flow path have a same length in the first direction and a same cross-sectional shape orthogonal to the first direction, and the supply-side narrowed flow path and the discharge-side narrowed flow path have a same length in the first direction and a same cross-sectional shape orthogonal to the first direction.

10. A liquid dispensing apparatus, comprising:

a liquid ejection head including:

a nozzle plate with a plurality of nozzles;

a plurality of pressure chambers respectively communicating with the plurality of nozzles;

a vibration plate disposed on a side of the plurality of pressure chambers opposite the nozzle plate;

a supply-side flow path on an inlet side of the plurality of pressure chambers;

a discharge-side flow path on an outlet side of the pressure chambers; and a plurality of piezoelectric elements positioned to vibrate the vibration plate to change a volume of the plurality of pressure chambers for ejecting a liquid from the plurality of nozzles, wherein the supply-side flow path has a flow path resistance that is the same as a flow path resistance of the discharge-side flow-path.

11. The liquid dispensing apparatus according to claim 10, further comprising:

a circulation system configured to circulate the liquid on a circulation flow path including the supply-side flow path, the plurality of pressure chambers, and the discharge-side flow path.

12. The liquid dispensing apparatus according to claim 10, the liquid ejection head further comprising:

a flow path substrate including wall members forming the supply-side flow path and the discharge-side flow path, wherein the supply-side flow path includes supply-side individual flow paths connecting to the pressure chambers and a supply-side common chamber connecting to the plurality of supply-side individual flow paths, the discharge-side flow path includes discharge-side individual flow paths connecting to the pressure chambers and a discharge-side common chamber connecting to the plurality of discharge-side individual flow paths, and the supply-side individual flow paths and the discharge-side individual flow paths are symmetrical.

13. The liquid dispensing apparatus according to claim 12, wherein the supply-side individual flow path includes a supply-side pressure flow path and a supply-side narrowed flow path, the discharge-side individual flow path includes a discharge-side pressure flow path and a discharge-side narrowed flow path, and the supply-side individual flow path, the pressure chamber, and the discharge-side individual flow path are disposed in order along a first direction.

14. The liquid dispensing apparatus according to claim 13, wherein the supply-side pressure flow path and the discharge-side pressure flow path have a same length in the first direction and a same cross-sectional shape orthogonal to the first direction, and the supply-side narrowed flow path and the discharge-side narrowed flow path have a same length in the first direction and a same cross-sectional shape orthogonal to the first direction.

15. The liquid dispensing apparatus according to claim 10, further comprising:

a circulation system configured to circulate the liquid on a circulation flow path including the supply-side flow path, the plurality of pressure chambers, and the discharge-side flow path, wherein the circulation system is configured to control a flow rate of the liquid on the circulation flow path to be in a range of $1/10$ to $1/2$ of a maximum flow rate of the liquid from the plurality of nozzles.

16. The liquid dispensing apparatus according to claim 10, further comprising:

a sheet conveyor configured to convey at sheet past the liquid ejection head.

17. An inkjet system, comprising:

a nozzle plate with a plurality of nozzles;

a plurality of pressure chambers respectively communicating with the plurality of nozzles;

a vibration plate disposed on a side of the plurality of pressure chambers opposite the nozzle plate;

a supply-side flow path on an inlet side of the plurality of pressure chambers;

a discharge-side flow path on an outlet side of the pressure chambers;

a plurality of piezoelectric elements positioned to vibrate the vibration plate to change a volume of the plurality of pressure chambers for ejecting a liquid from the plurality of nozzles; and a circulation system configured to circulate the liquid on a circulation flow path including the supply-side flow path, the plurality of pressure chambers, and the discharge-side flow path, wherein the supply-side flow path and the discharge-side flow-path are symmetrical with respect to a position of the plurality of nozzles.

18. The inkjet system according to claim 17, wherein the supply-side flow path includes supply-side individual flow paths connecting to the pressure chambers and a supply-side common chamber connecting to the plurality of supply-side individual flow paths, and the discharge-side flow path includes discharge-side individual flow paths connecting to the pressure chambers and a discharge-side common chamber connecting to the plurality of discharge-side individual flow paths.

19. The inkjet system according to claim 18, wherein the supply-side individual flow path includes a supply-side pressure flow path and a supply-side narrowed flow path, and the discharge-side individual flow path includes a discharge-side pressure flow path and a discharge-side narrowed flow path.

20. The inkjet system according to claim 17, wherein the supply-side flow path has a flow path resistance that is the same as a flow path resistance of the discharge-side flow-path.

* * * * *